(12) United States Patent
House et al.

(10) Patent No.: US 9,068,598 B2
(45) Date of Patent: Jun. 30, 2015

(54) SLIDING CLIP METHOD FOR ANTI-ROTATION AND THRUST CONSTRAINT OF A ROLLING ELEMENT BEARING CARTRIDGE

(75) Inventors: Timothy House, Hendersonville, NC (US); Paul Diemer, Arden, NC (US); Allan Kelly, Hendersonville, NC (US); Augustine Cavagnaro, Flat Rock, NC (US)

(73) Assignee: BorgWarner Inc., Auburn Hills, MI (US)

( * ) Notice: Subject to any disclaimer, the term of this patent is extended or adjusted under 35 U.S.C. 154(b) by 720 days.

(21) Appl. No.: 13/318,658

(22) PCT Filed: Apr. 30, 2010

(86) PCT No.: PCT/US2010/033101
§ 371 (c)(1),
(2), (4) Date: Nov. 3, 2011

(87) PCT Pub. No.: WO2010/129404
PCT Pub. Date: Nov. 11, 2010

(65) Prior Publication Data
US 2012/0045326 A1 Feb. 23, 2012

Related U.S. Application Data

(60) Provisional application No. 61/176,168, filed on May 7, 2009.

(51) Int. Cl.
*F01D 25/16* (2006.01)
*F16C 27/04* (2006.01)
*F16C 35/067* (2006.01)
(Continued)

(52) U.S. Cl.
CPC .............. *F16C 35/067* (2013.01); *F01D 25/16* (2013.01); *F01D 25/162* (2013.01); *F02C 6/12* (2013.01); *F16C 19/184* (2013.01); *F16C 27/04* (2013.01); *F05D 2220/40* (2013.01); *F16C 2360/24* (2013.01)

(58) Field of Classification Search
USPC .......................................................... 417/407
See application file for complete search history.

(56) References Cited

U.S. PATENT DOCUMENTS 4,281,601 A * 8/1981 Overman ...................... 102/276
4,425,520 A * 1/1984 Hiraga ...................... 192/84.961
(Continued)

FOREIGN PATENT DOCUMENTS

CN 1201105 12/1998
CN 101069023 11/2007
(Continued)

*Primary Examiner* — Nathaniel Wiehe
*Assistant Examiner* — Michael Sehn
(74) *Attorney, Agent, or Firm* — Miller Canfield

(57) ABSTRACT

To solve both axial and rotational constraint problems in turbochargers with rolling element bearings (REBs), a REB cartridge is mounted to the bearing housing in a way that is not rigid, thus allowing for an oil damping film. At the same time, the REB cartridge is held both axially and rotationally, so that the outer race does not rotate relative to the bearing housing. This dual purpose is achieved using a special dual-mode sliding clip with at least one anti-rotation feature for engaging the bearing housing and at least one anti-rotation feature for engaging the REB cartridge, thereby axially locating the REB cartridge and preventing rotation of the outer race.

11 Claims, 12 Drawing Sheets

(51) Int. Cl.
*F02C 6/12* (2006.01)
*F16C 19/18* (2006.01)

(56) References Cited

U.S. PATENT DOCUMENTS

| | | | | |
|---|---|---|---|---|
| 4,708,602 A | * | 11/1987 | McEachern et al. | 417/407 |
| 4,997,290 A | | 3/1991 | Aida | |
| 5,059,844 A | * | 10/1991 | Anstine | 310/90 |
| 5,145,334 A | * | 9/1992 | Gutknecht | 417/407 |
| 5,947,265 A | * | 9/1999 | Merten et al. | 198/834 |
| 5,961,281 A | * | 10/1999 | Ojima et al. | 415/173.6 |
| 6,126,414 A | | 10/2000 | Koike | |
| 2003/0072509 A1 | | 4/2003 | Woollenweber | |
| 2003/0142891 A1 | * | 7/2003 | Iwamoto et al. | 384/448 |
| 2007/0110351 A1 | | 5/2007 | Larue | |
| 2008/0019629 A1 | * | 1/2008 | McKeirnan | 384/493 |
| 2009/0081040 A1 | | 3/2009 | Ueno et al. | |

FOREIGN PATENT DOCUMENTS

| | | |
|---|---|---|
| JP | 2002039191 | 2/2002 |
| JP | 2005163641 | 6/2005 |

* cited by examiner

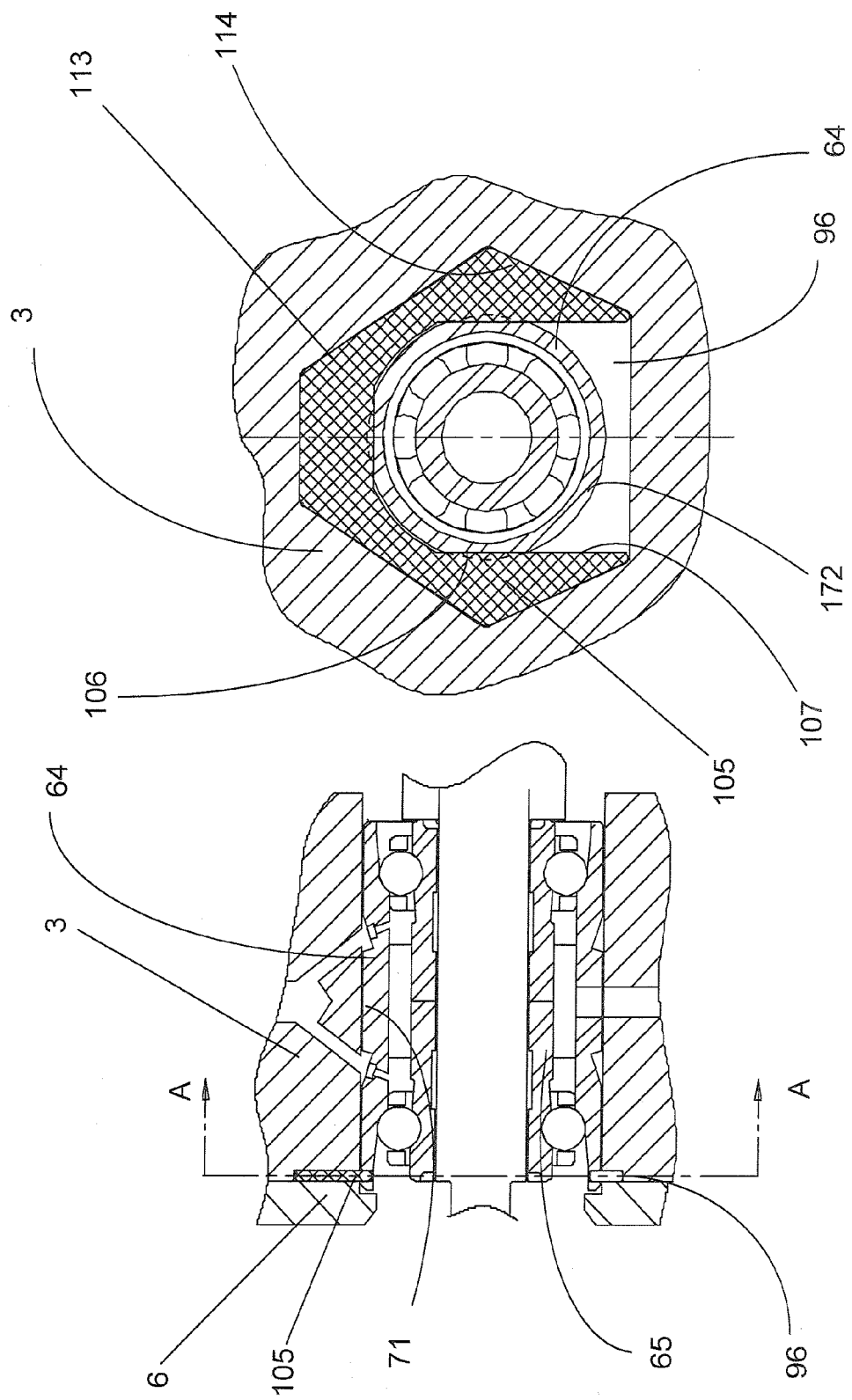

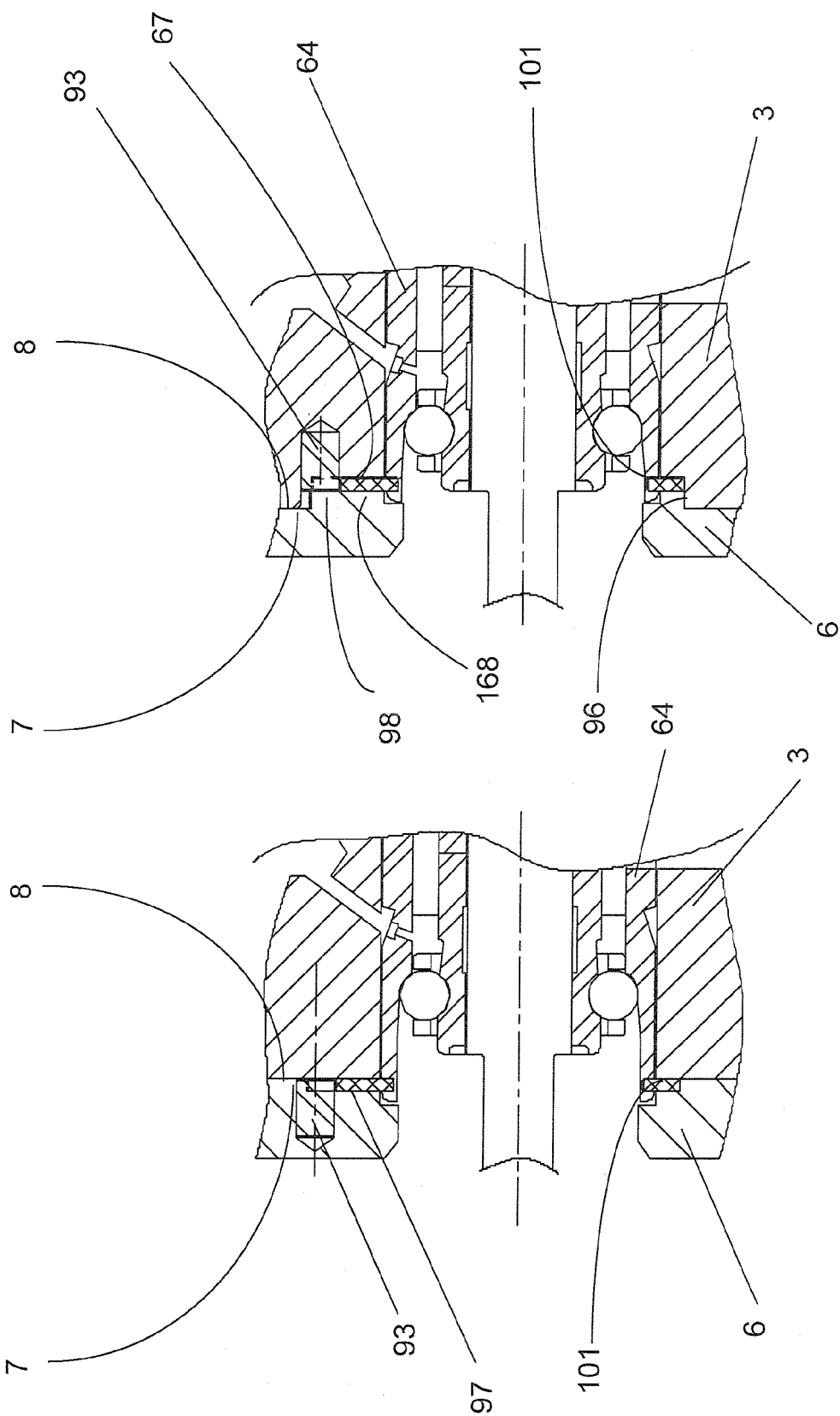

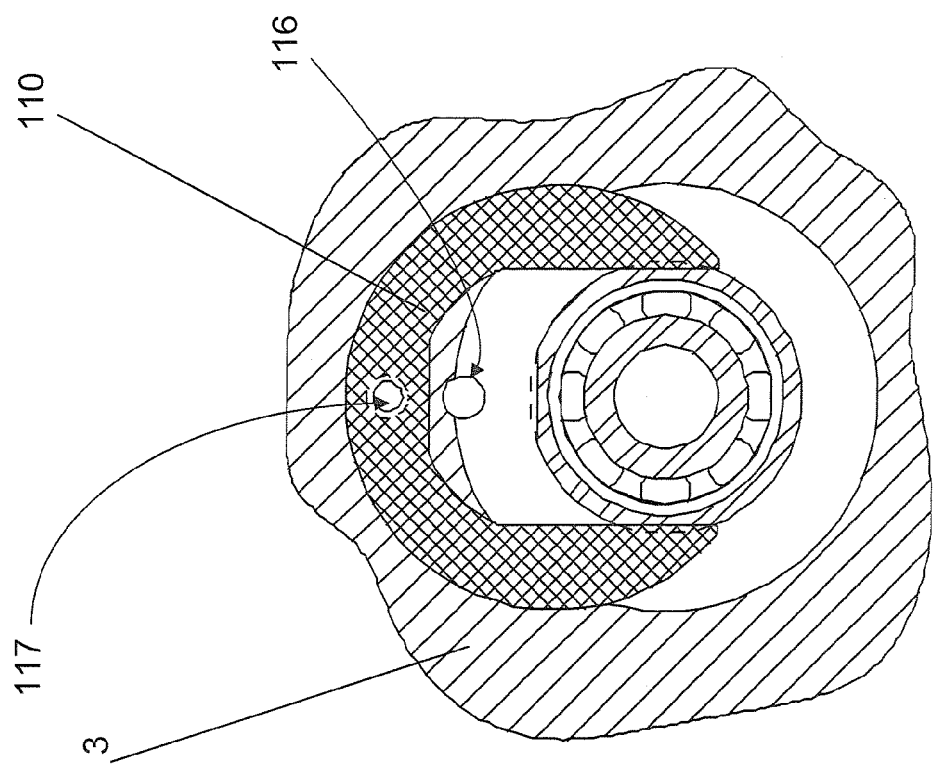
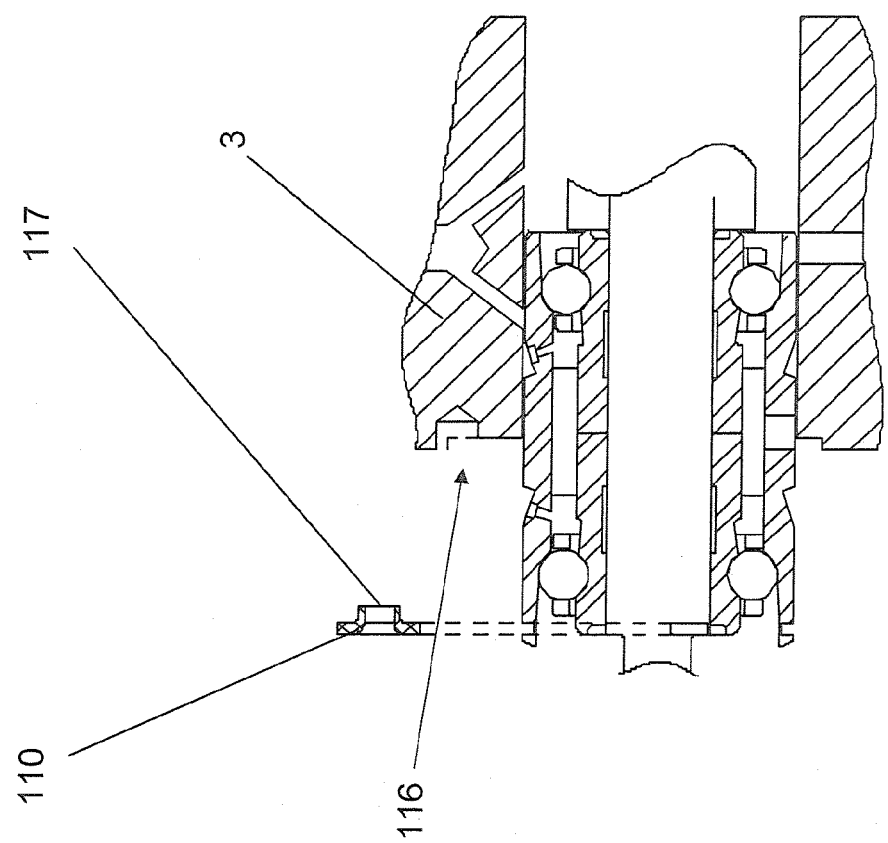
Fig. 12B
Fig. 12A

SLIDING CLIP METHOD FOR ANTI-ROTATION AND THRUST CONSTRAINT OF A ROLLING ELEMENT BEARING CARTRIDGE

FIELD OF THE INVENTION

This invention is directed to a system for constraint of a turbocharger rolling element bearing cartridge, and more particularly, to a system that, with simple machining and low cost parts, ensures correct assembly and provides anti-rotation as well as constraint against thrust loads in either axial direction. The invention provides a simple system for mounting the rolling element bearing (REB) cartridge with sufficient play to allow for damping by an encapsulating oil film or an oil flow under pressure, but, at the same time, allowing the REB cartridge to be held axially, to transfer the axial loads to the bearing housing, and rotationally, so that the REB cartridge does not rotate relative to the bearing housing.

BACKGROUND OF THE INVENTION

Turbochargers deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers are a type of forced induction system which use the exhaust flow entering the turbine housing from the engine exhaust manifold to drive a turbine wheel (51) which is located in the turbine housing. The turbine wheel is solidly affixed to a shaft to become the shaft and wheel assembly. A compressor wheel (20), is mounted to the stub shaft (56) end of the shaft and wheel and held in position by the clamp load from a compressor nut (29). The primary function of the turbine wheel is extracting rotational power from the exhaust gas to drive the compressor.

The compressor stage consists of a wheel (20) and its housing. Filtered air is drawn axially into the inlet of the compressor cover by the rotation of the compressor wheel. The power input by the turbine stage to the shaft and wheel drives the compressor wheel to produce a combination of static pressure with some residual kinetic energy and heat. The pressurized gas exits the compressor cover through the compressor discharge and is delivered, usually via an intercooler, to the engine intake.

In one aspect of compressor stage performance, the efficiency of the compressor stage is influenced by the clearances between the compressor wheel contour (28) and the matching contour in the compressor cover. The closer the compressor wheel contour is to the compressor cover contour, the higher the efficiency of the stage. In a typical compressor stage with a 76 mm compressor wheel, the tip clearance is in the regime of from 0.31 mm to 0.38 mm. The closer the wheel is to the cover, the higher the chance of a compressor wheel rub; so, there must exist a compromise between improving efficiency and improving durability.

To the naked eye, the nose of the compressor wheel in a typical turbocharger appears to rotate about the geometric longitudinal axis of the bearing housing; however, when viewed as a track on an x,y-oscilloscope, the nose of the compressor wheel describes orbits of various shapes. The average centroid of the orbits is close to, but not exactly centered on, the geometric longitudinal axis of the turbocharger. The geometric axis (100) is shown in FIG. 1, of the turbocharger.

The dynamic excursions taken by the shaft and wheels are attributed to a number of factors including: the unbalance of the rotating assembly; the excitation of the pedestal (i.e., the engine and exhaust manifold); and the low speed excitation from the vehicle's interface with the ground.

The net effect of these excursions taken by the shaft and wheels is that the design of the typical turbocharger has clearances far greater than those desired for aerodynamic efficiency levels.

The typical turbocharger is fed with oil from the engine. This oil, at a pressure typically equal to that of the engine, performs several functions. The oil is delivered to both sides of the journal bearings to provide a double hydrodynamic squeeze film, the pressures of which exert reactionary forces of the shaft on the inner diameter (I.D.) of the bearing and of the outer diameter (O.D.) of the bearing on the bearing housing bore. The oil films provide attenuation of the reactionary forces to reduce the amplitude of the excursions of the shaft. The oil also functions to remove heat from the turbocharger.

A typical turbocharger design has two adjacent bearing systems: one at the compressor-end of the bearing housing; and one at the turbine-end of the bearing housing. Each system has two interfaces: the interface of the rotating shaft on the I.D. of the floating bearing, and the interface of the O.D. of the floating bearing on the fixed bore of the bearing housing.

The stiffness and damping capacities of the typical turbocharger double hydrodynamic squeeze film bearings are a compromise between: the thickness of the oil film generated by the rotational speed of the bearing elements, the clearance between said elements, and the oil flow limitations due to the propensity of turbochargers to pass oil through the piston ring seals at either end of the shaft.

The problems of loss of efficiency due to excessive clearances between wheels and housings include: high oil flow rates for bearing support, bearing damping, heat transfer, and power losses, and these problems are solved by the use of rolling element bearings (REB) to support and locate the rotating assembly in the turbocharger.

FIG. 1 depicts a typical turbocharger double hydrodynamic squeeze film bearing configuration. In this configuration, pressurized oil is received to the bearing housing (3) though an oil inlet (80) from the engine. The oil is pressure-fed through the oil galleries (82 and 83) to the bearing housing journal bearing bore. For both the turbine-end and compressor-end bearings (30), the oil flow is delivered to the shaft and wheel journal bearing zones where the oil is distributed around the shaft to generate an oil film between the shaft surface (52) and the inner bore of the floating journal bearings (30). On the outside of the journal bearings (30), a like oil film is generated by the rotation of the journal bearing against the bearing housing journal bearing bore. Once through the journal and thrust bearings the oil exits the bearing housing via the oil drain (85) at the base of the bearing housing, and is returned to the crankcase of the engine.

In the typical turbocharger depicted in FIG. 1, the thrust bearing (19) is also a hydrodynamic or fluid film type of bearing. In this configuration, the stationary thrust bearing is fed oil from the oil gallery (81) to feed a ramp and pad design of the bearing. The oil is driven into a wedge shape by the relative motion of the thrust washer (40) and the opposing face of the flinger (44), which is mounted to the shaft, against the static thrust ramp and pad. This bearing controls the axial position of the rotating assembly.

One method for increasing the efficiency of the turbocharger is the adoption of rolling element bearings (REBs) to support the rotating assembly. Rolling element bearings can be divided into two general types. The first type uses a pair of typical REB assemblies. Each REB assembly, in this case, consists of an outer race, the balls or roller elements, an inner race, a cage, and seals. This pair of REB assemblies can be pressed or shrunk into a sleeve, i.e., an outer cylindrical housing with oil galleries and locations for the REB assemblies, to produce the REB cartridge. In the second type, the sleeve is omitted, and the outer race of the REB assembly defines the outer diameter of the REB cartridge. Unless otherwise indicated, the term "REB" used herein will refer to the REB cartridge.

As seen in FIG. 2 REBs typically have an inner race (65), which is mounted to the shaft and wheel journal surface (52). Assembled to the inner race, or races (65, 65C and 65T) are a set of rolling elements connecting the inner race to the outer race (64) (FIG. 6). The outer race is mounted within the bore (71) in the bearing housing (3). Since rolling element bearings do not require as much oil as do typical turbocharger journal bearings, an oil restrictor (86) is fitted to the oil inlet (80) to restrict the flow REBs.

There are several improvements that come with the adoption of rolling element bearing turbochargers. There is an improvement in transient response due to the reduction in power losses, especially at low turbocharger RPM, of the REB system over the typical turbocharger bearing system. The power losses in REB systems are from 5 to 10 times less than those for typical sleeve-type turbocharger bearing systems. REB systems can support much greater thrust loads than can typical turbocharger bearing systems making the thrust component more robust. Since typical ramp and pad thrust bearings require a large percentage of the oil flow delivered to the turbocharger, and REB systems require less oil flow (than a typical turbocharger bearing system), then less oil flow is required for a REB system with the positive consequence that there is less propensity for oil passage to the compressor or turbine stages where that oil can poison the catalyst.

Although ball bearing systems provide these efficiency and transient performance gains, the damping capacity of ball bearings is not as good as that of the typical turbocharger double hydrodynamic squeeze film bearings. For ease of assembly, the ball bearings are retained in a steel REB cartridge, which is suspended within the bearing housing by an oil film between the O.D. of the cartridge (172) and the I.D. of the bearing housing bore (71). The oil is used for damping of shaft critical events and for lubrication of the bearings. With this design it is critical that the bearing cartridge is not in a metal-to-metal contact with the bearing housing bore as the damping function will be lost.

U.S. Pat. No. 5,145,334 (Gutknecht) and U.S. Pat. No. 7,214,037 (Mavrosakis) teach methods for the retention of a floating bearing cartridge in a bearing housing. A post secured in the bearing housing (e.g., restrictor (86)) restrains the bearing cartridge such that the post reacts against the axial and rotational forces, while allowing for otherwise unconstrained motion (float) of the bearing cartridge in the bearing housing. In U.S. Pat. No. 7,214,037, as shown in FIG. 4, a pin (460) received by an opening (444) of the housing (440) optionally aids in locating the cartridge azimuthally, with respect to the housing (440). A pin (72) similar to that of U.S. Pat. No. 5,145,334 is shown in FIG. 3 of the present application, locating a bore (68) in the cartridge and a bore (70) in the outer race to provide both axial and rotational constraint relative to the bearing housing. Both of these methods require machining through orifices in the bearing housing, and, furthermore, they require intricate assembly in an area not well-visible to the assembler, making both correct assembly and verification of the assembly of said pins difficult.

U.S. Pat. No. 7,214,037 teaches the use of a counter-bore (442, FIG. 4) and a plate (450) to control the axial loads exerted on the outer race of the bearing cartridge. The machining of this counter-bore requires accurate placement of the cutting tool, which must change direction from cutting a diametral surface to an abutment surface deep inside the bearing housing, without leaving too great an inclusive corner radius which might not allow the bearing cartridge to seat on the abutment. The execution of this process adds cost and complexity to the machining of the bearing housing.

So it can be seen that the current state of axial and rotational constraint of the REB cartridge is both costly and complex. A more cost and technically effective solution is needed.

SUMMARY OF THE INVENTION

The present inventors considered that there existed a need to solve the above problems of mounting the REB cartridge, in a manner which allowed for damping by an encapsulating oil film (which may be static or dynamic), but, at the same time, allowing the REB cartridge, to be held axially, to transfer the axial loads to the bearing housing, and rotationally, so that the REB cartridge, does not rotate relative to the bearing housing. There is thus a need for a cost-effective, simple to assemble, anti-rotation feature to allow a damping oil film around the REB cartridge, yet prevent the REB assembly from rotating relative to the bearing housing.

The inventors solved the problems by developing a dual-mode sliding clip that provides a simple, assembly-foolproof, low cost, easy to machine, anti-rotation feature, allow a damping oil film flow around the REB cartridge, if needed, yet preventing the bearing cartridge of a rolling element bearing assembly from rotating relative to the bearing housing.

BRIEF DESCRIPTION OF THE DRAWINGS

The present invention is illustrated by way of example and not by limitation in the accompanying drawings in which like reference numbers indicate similar parts and in which:

FIGS. 10A, 10B depict the second embodiment of the invention;

FIGS. 11A, 11B depict variations of the first embodiment of the invention; and

FIGS. 12A, 12B depict further variations of the first embodiment of the invention.

DETAILED DESCRIPTION OF THE INVENTION

Although there are problems associated with the conventional methods for constraint of a ball bearing cartridge against rotation relative to the bearing housing in which it mounts, the omission of axial and radial constraint would allow the wheels to contact the housings and would allow the cartridge to spin in the bearing housing, each of which would shorten the life of the turbocharger.

The invention provides a dual-mode sliding clip and a constraining system using the dual-mode sliding clip. The dual-mode sliding clip features at least one non-round radially inner surface for engaging in a complementary non-round surface of the REB cartridge, preferably formed in a groove, at least one non-round radially outer surface for engaging in a complementary non-round surface of the bearing housing, the radially inner and outer engagements producing an anti-rotation constraint of the REB cartridge, and first and second axial surfaces, adapted for being seated radially outwardly in a groove in the bearing housing or defined between the bearing housing and bearing housing closure plate and radially inwardly in a groove in the REB cartridge, and preventing axial movement of the REB cartridge in the compressor direction as well as in the turbine direction.

In a first embodiment of the invention, the inventors saw the need for employing a device which fulfilled both the needs for constraint of the REB cartridge, in both axial and rotational directions, and the need to be simply seen for visual inspection by the assembly personnel to ensure that said device was actually installed in the completed turbocharger assembly.

In the first embodiment of the invention, the inventors designed an interface between the REB cartridge and the bearing housing, which allowed ease of machining of the bore in the bearing housing, ease of assembly of the parts, and an anti-rotation feature.

Figure 1:
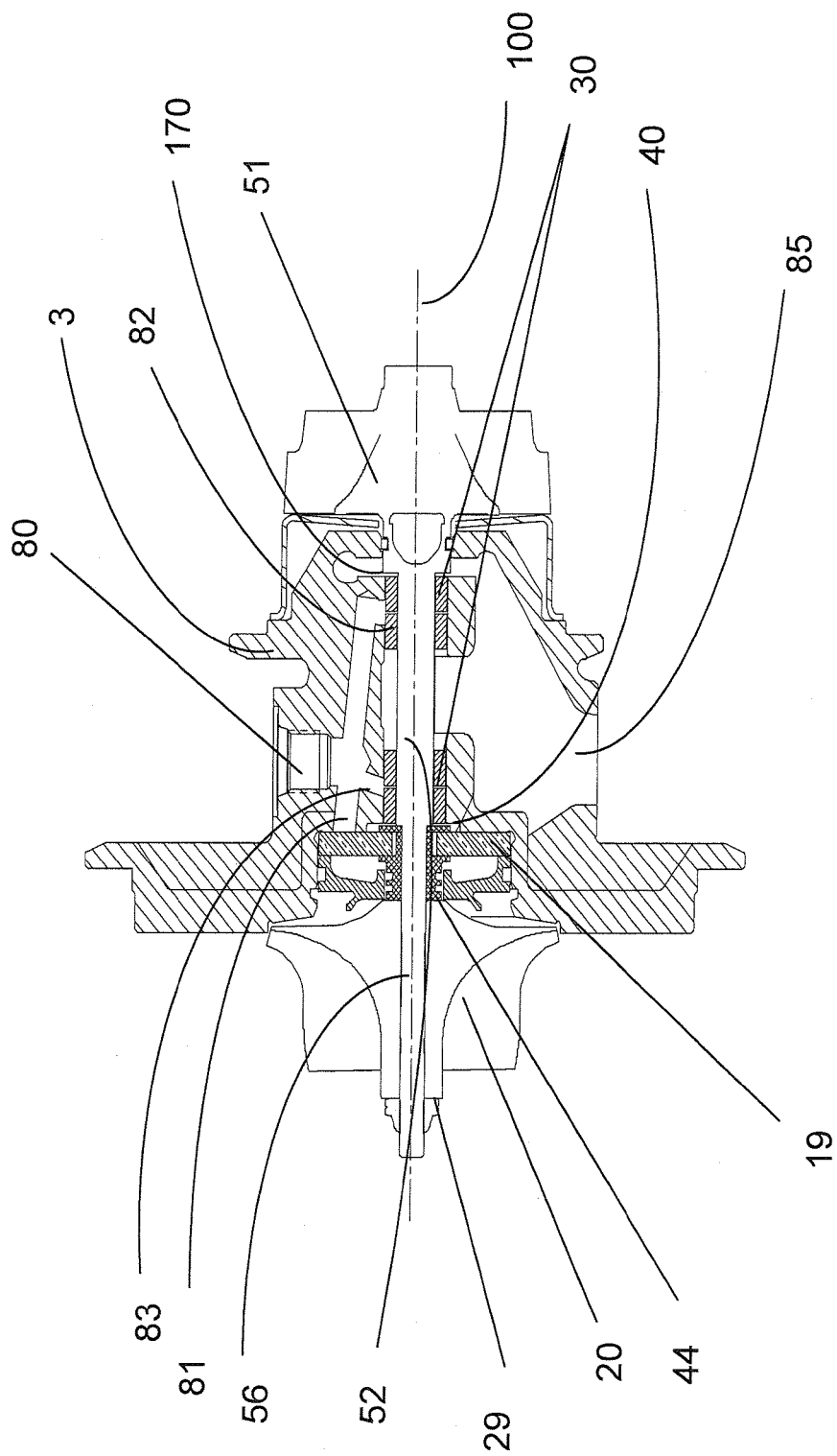
FIG. 1 depicts a section of a turbocharger assembly.
Figure 2:
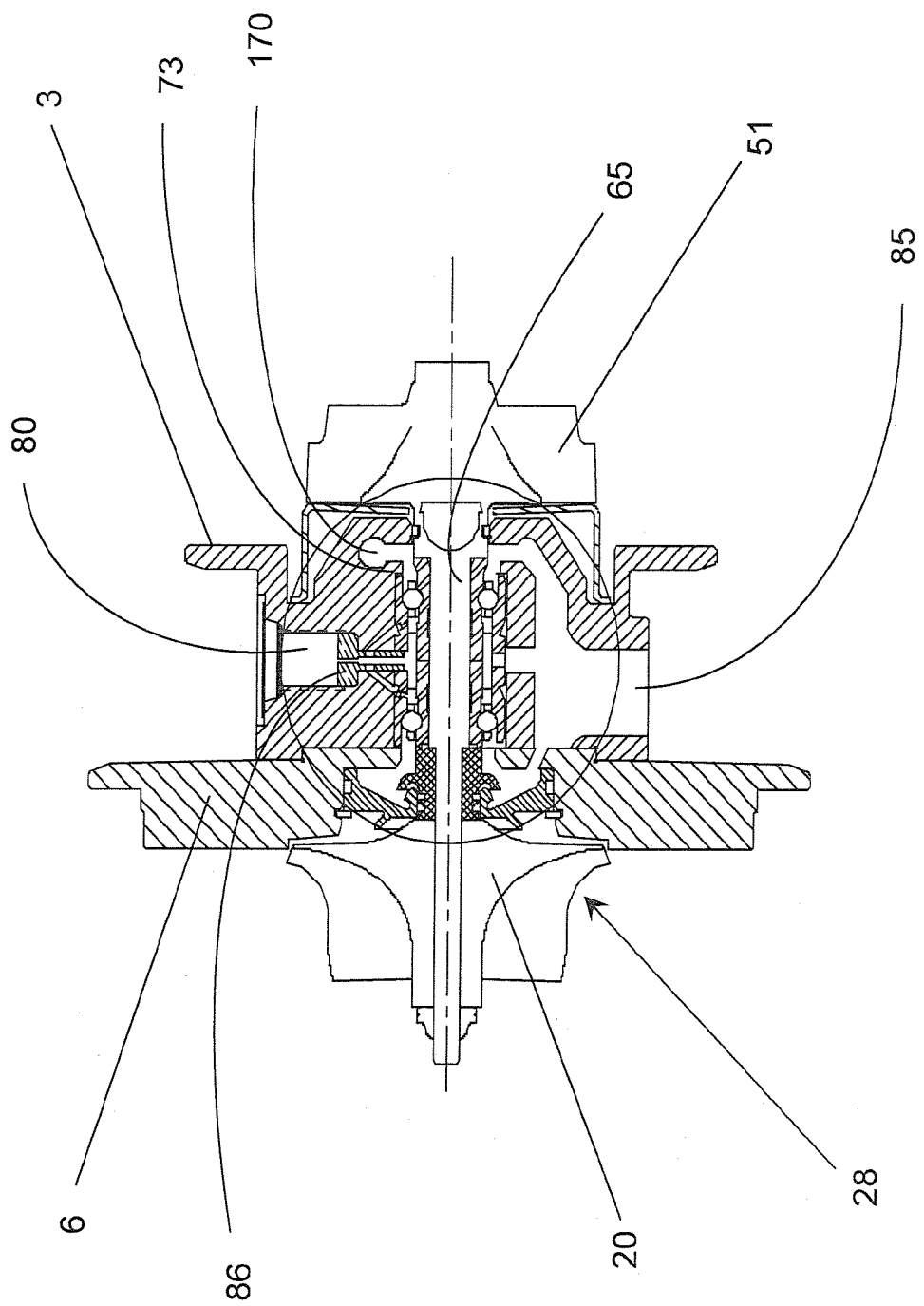
FIG. 2 depicts a section of a typical ball bearing turbocharger bearing housing assembly.
Figure 3:
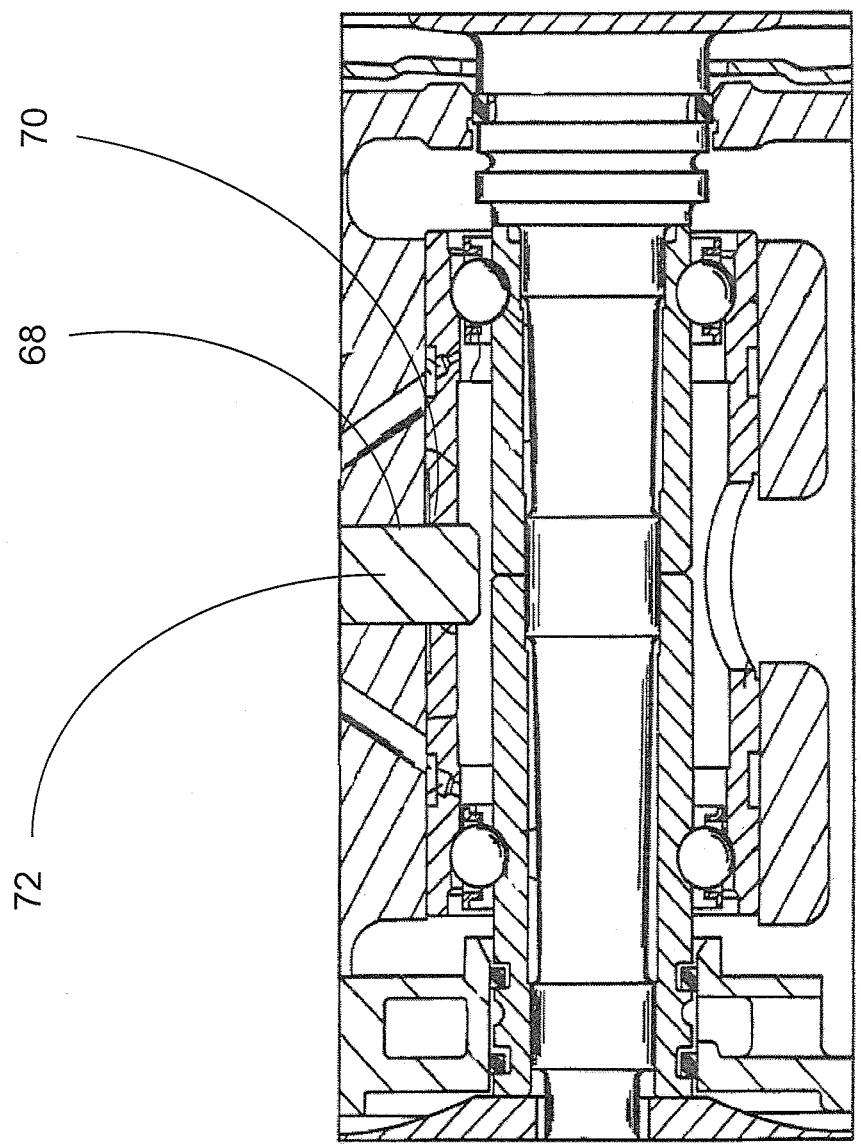
FIG. 3 depicts a prior art roller bearing.
Figure 4:
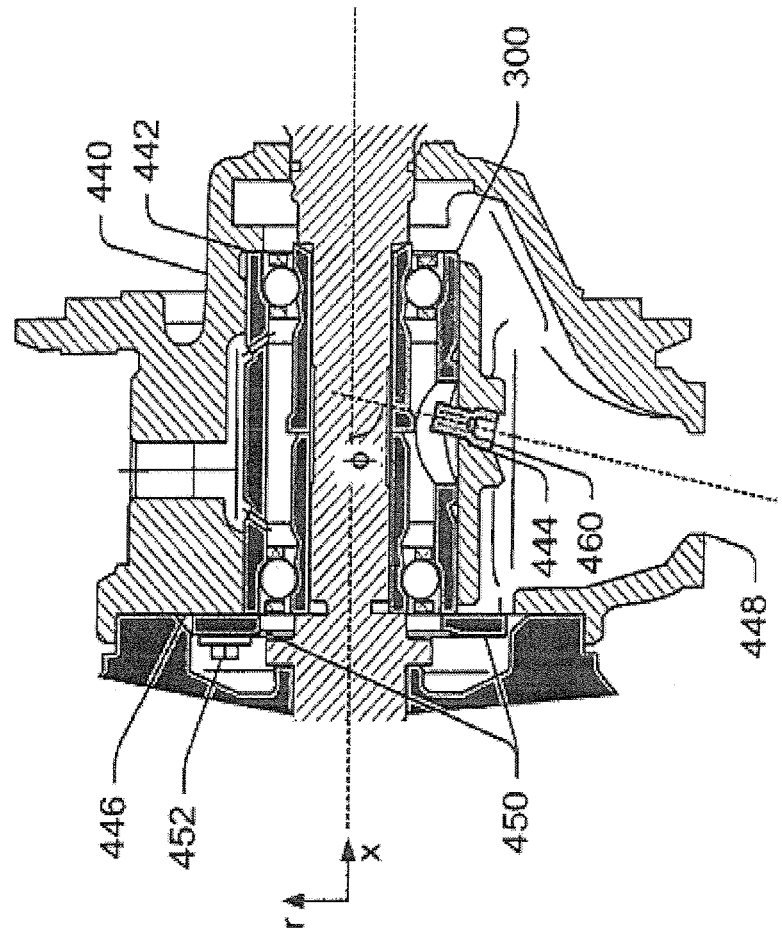
FIG. 4 depicts another prior art roller bearing.
Figure 5:
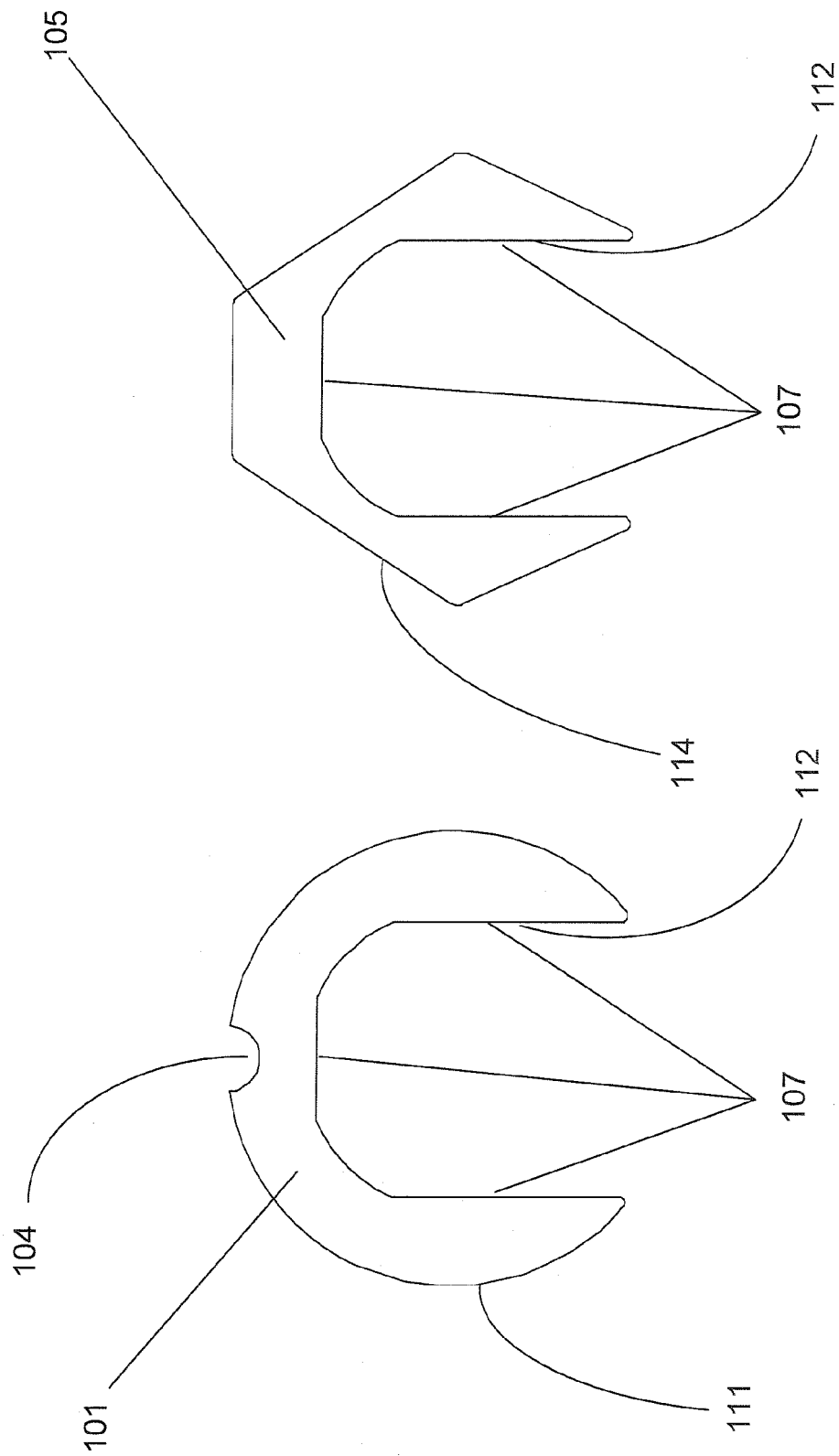
FIGS. 5A, 5B depict views of a first and second embodiment of the invention.

In accordance with the invention, the turbine-end axial abutment (73), shown in FIG. 2, which was a feature of conventional restraining, is no longer required, allowing the bearing housing bore (71) to be machined with constant diameter where it opens out into the oil flinger cavity (170). While this may seem only a slight modification, it represents in fact a substantial improvement in manufacturability. Elimination of the turbine-end axial abutment (73) allows the bearing housing bore to be honed to improve the surface finish whereas, with an abutment present, the process of honing a cylindrical surface in a blind hole is quite difficult.

A first embodiment of the dual-mode sliding clip (101), as shown in FIGS. 5 to 8, has a radially inside surface (112) and a radially outside surface (111). The dual-mode sliding clip (101) has one or more non-round, e.g., flat sections or shapes generally providing rotational constraint (107), fabricated into the generally round or circular inside surface (112) of the clip such that, when assembled to the REB cartridge (64) the flat sections (107) in the dual-mode sliding clip (101) fit to the corresponding flat inner sections (106) of grooves (94), fabricated into the REB cartridge.

On the radially outer surface (111) the dual-mode sliding clip (101) of the first embodiment has a scallop (104), projecting radially inwards, which fits around a pin (93), axially mounted in the bearing housing to prevent rotation of the sliding clip with respect to the bearing housing. This rotationally arresting arrangement of dual-mode sliding clip to bearing housing, and rotationally arresting arrangement of REB cartridge, to dual-mode sliding clip, thus constrains the REB cartridge from rotating relative to the bearing housing.

Figure 8:
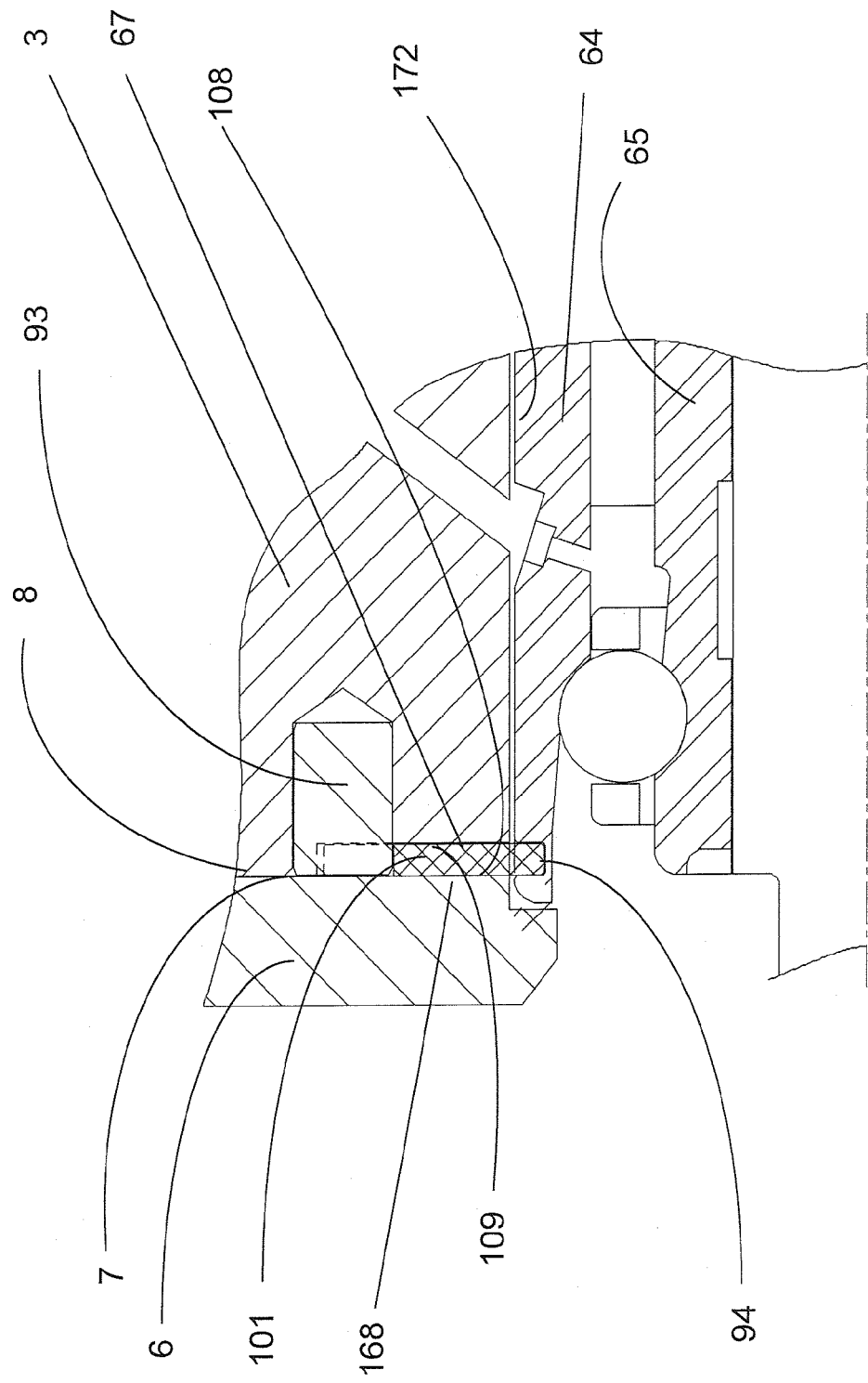
FIG. 8 depicts a further magnified view of FIG. 7A.

The dual-mode sliding clip (101) has two, usually flat, axial or "cheek" faces. The bearing housing radially has a recess adapted to receive the sliding clip, and the REB cartridge, radially has a groove adapted to receive the sliding clip, such that with axial thrust from the REB cartridge in the direction of the turbine, the sliding clip turbine-side cheek face (109), as seen in FIG. 8, bears on the turbine side of the recess (67) in the bearing housing (3), and with axial thrust in the direction of the compressor the compressor-side cheek face (108) of the dual-mode sliding clip bears on the turbine-side face (168) of the bearing housing closure (6).

The dual-mode sliding clip (101) can be variously designed, so long as it provides, in conjunction with the bearing housing, both axial and rotational constraint of the REB cartridge in the bearing housing.

While in the first exemplary embodiment of the invention, the rotational constraint of the REB cartridge to the dual-mode sliding clip takes the form of three flat surfaces in the sliding clip interlocking with three flat surfaces in the REB cartridge, there could be any number greater than one flat surface, interlocking with the same number of flat surfaces in the REB cartridge, to both provide the rotational constraint and a unique angular alignment so that any oil channel machined into the bearing housing communicates with a corresponding oil channel machined into the outer race.

While in the first exemplary embodiment of the invention the rotational constraint of the REB cartridge to the dual-mode sliding clip takes the form of three linear or flat surfaces in the sliding clip interlocking with three flat surfaces in the REB cartridge, there could be other rotationally constraining geometries, such as curves or tabs in either the dual-mode snap ring or the REB cartridge, which perform the same function.

Figure 6:
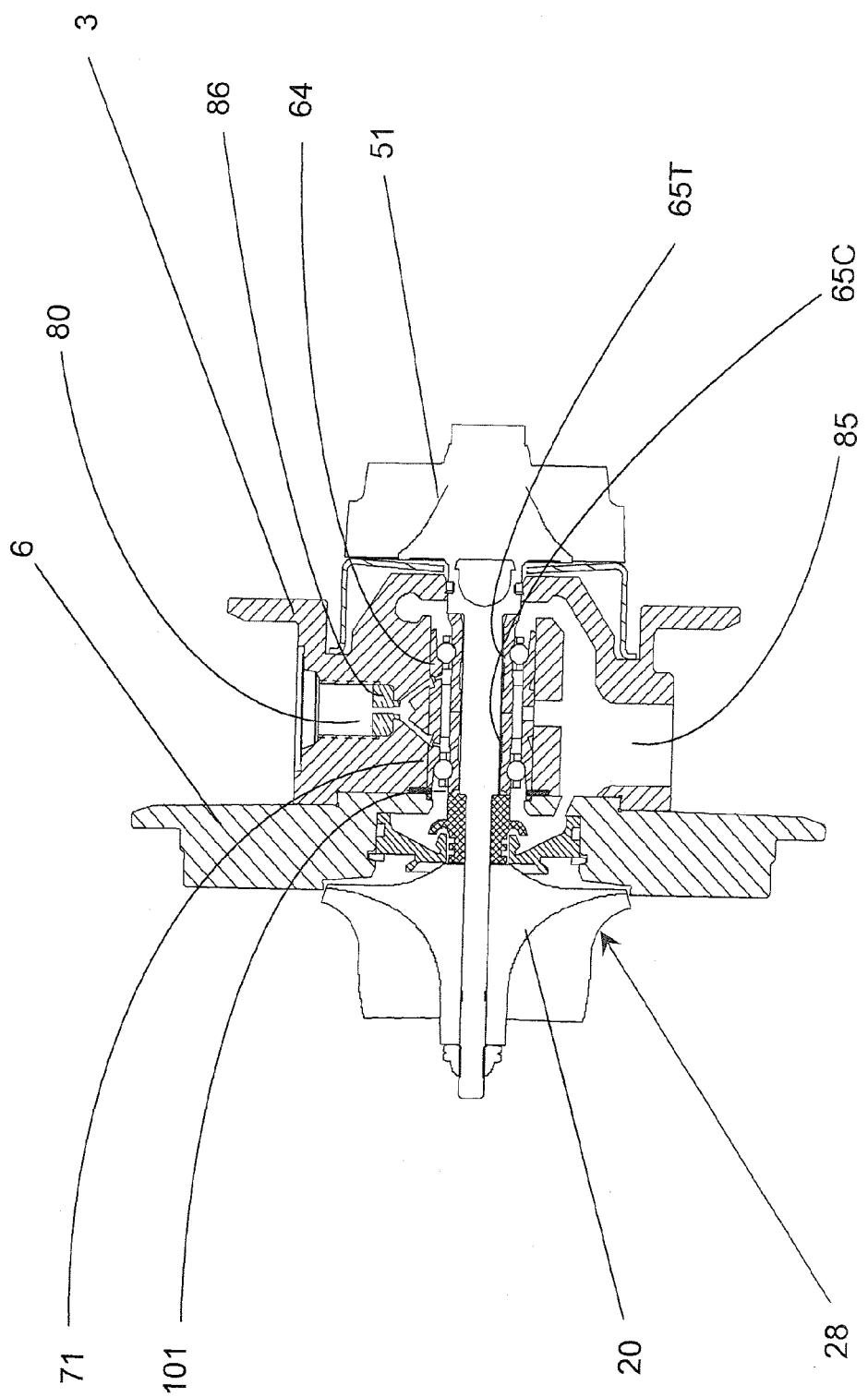
FIG. 6 depicts a view of a sectioned bearing housing assembly with the first embodiment of the invention.
Figure 7:
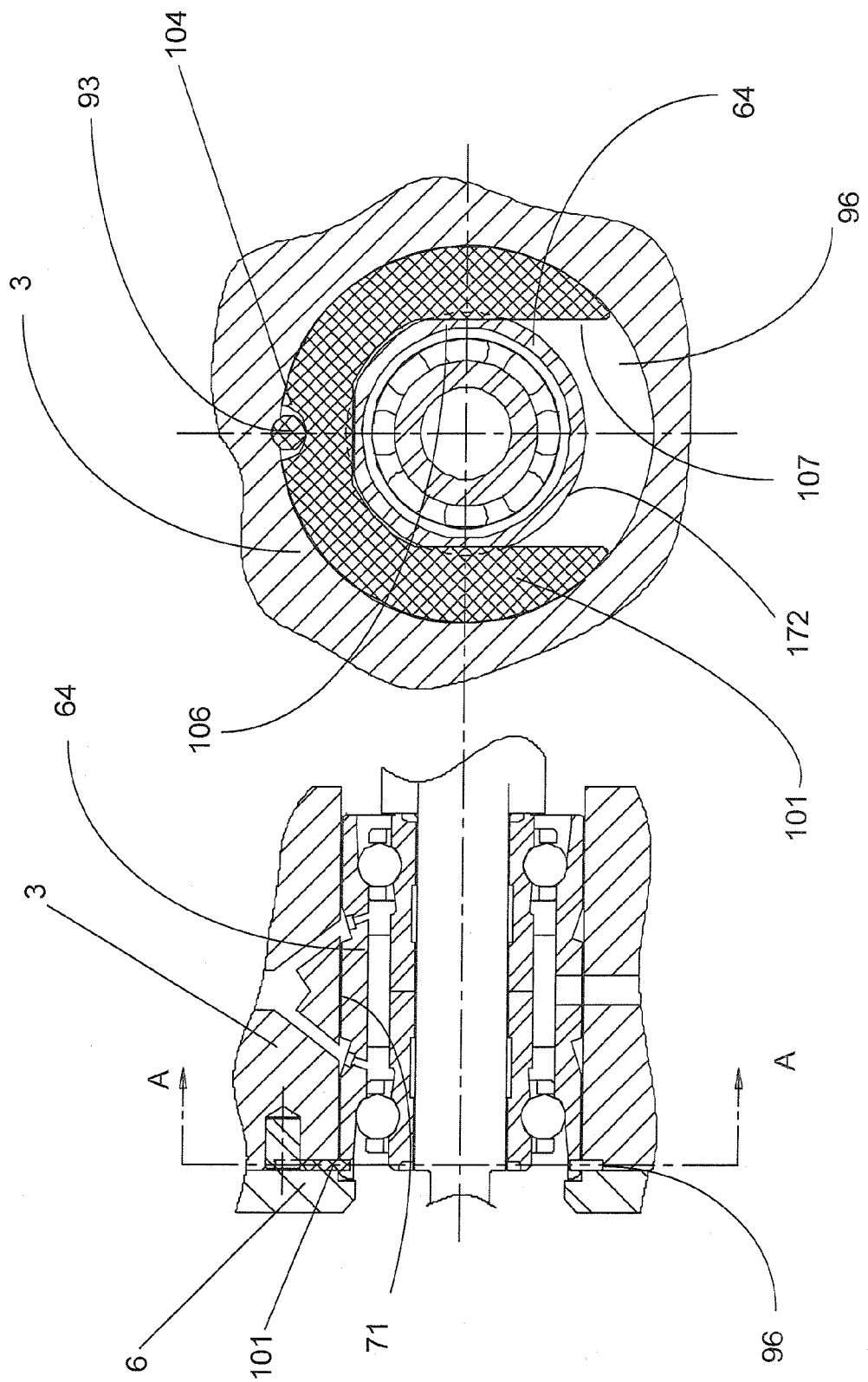
FIGS. 7A, 7B depict section views of the first embodiment of the invention.

As depicted in FIGS. 6, 7A and 7B, and magnified for clarity in FIG. 8, the compressor-end face (8) of the bearing housing (3) has material moved or removed from it to accept the axial thickness and/or shape of the dual-mode sliding clip (101). The shape (96) of the material removed or moved from the compressor-end face (8) of the bearing housing (3) is a reverse image, with clearance, of the dual-mode sliding clip (101), with allowance for the anti-rotation feature (104) of the sliding clip (101) and the rotationally arresting pin (93), with the dual-mode sliding clip in the assembled-to-the-REB cartridge state.

Figures 9A, 9B:
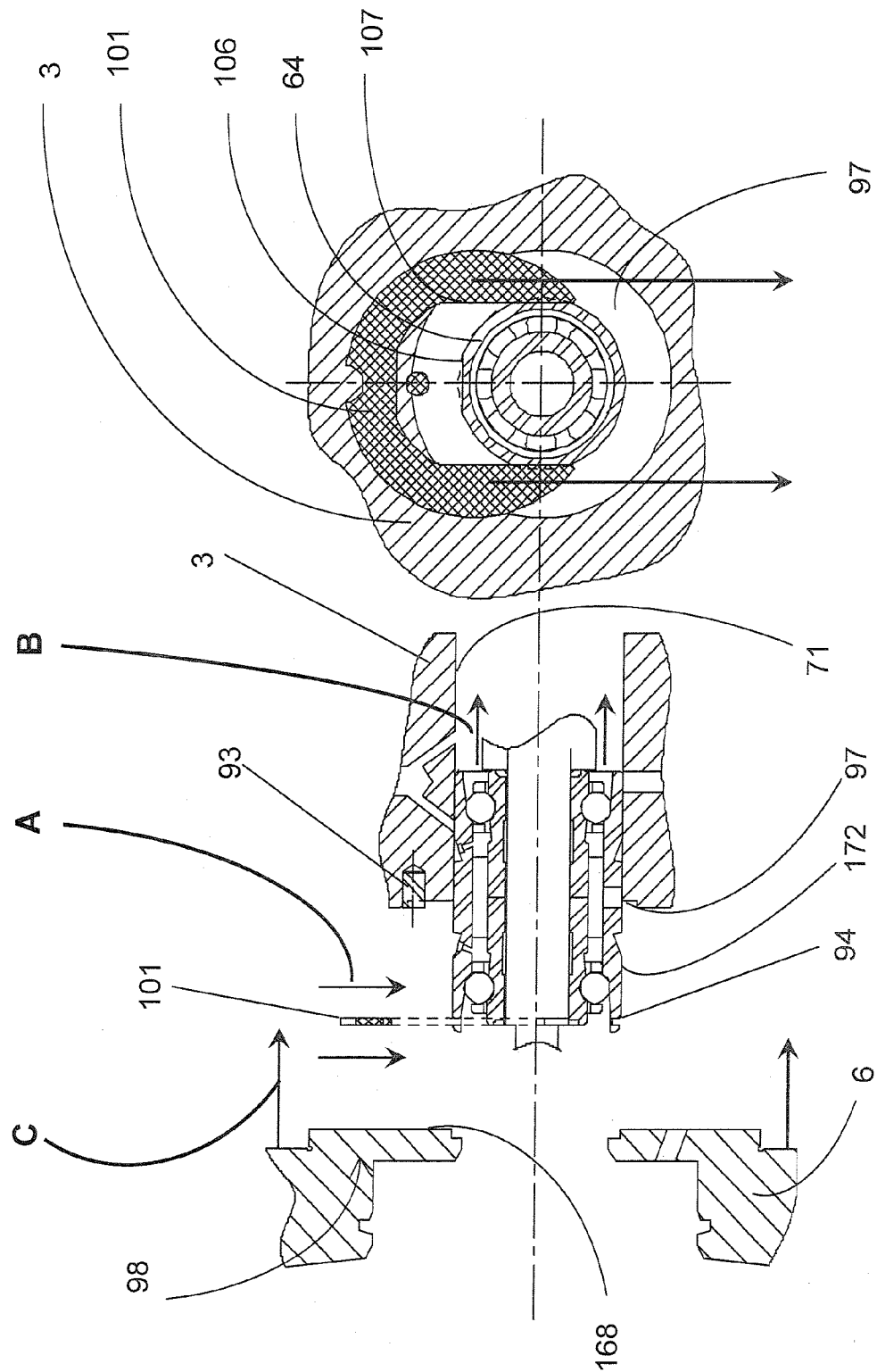
FIGS. 9A, 9B depict assembly protocols of front elevation and end elevations of the invention.

To assemble a REB cartridge restraint with the design of the first embodiment of the invention, as seen in FIGS. 9A and B, the assembly is performed in order. In stage "A", the dual-mode sliding clip (101) is slid into the groove (94) in the REB cartridge. This now aligns the sliding clip in a unique orientation to the REB cartridge. In stage "B", this (partial) assembly is then slid towards the turbine-side in the bore (71) in the bearing housing (3) and rotated until the scallop (104) of the sliding clip aligns with the pin (93) in the bearing housing. This alignment of scallop and pin presents the REB cartridge in the correct, unique, orientation for the oil inlet and oil drain to match the corresponding ports in the bearing housing. The thickness between the cheek surfaces (108 and 109) of the sliding clip is less than the depth of the scallop (96), so when assembled correctly, the surface (108) of the dual-mode sliding clip is beneath the surface (8) of the bearing housing.

In the exemplary first embodiment of the invention, as depicted in FIGS. 6 to 9, a bearing housing closure (6) has a positive ledge or abutment (98) in the axial direction with a generally circular radial shape, albeit slightly smaller to allow assembly of the reverse image of the sliding clip outer surface and shape (111), and a depth of the abutment dimensioned to fit into the assembly of the REB cartridge and sliding clip previously introduced into the bearing housing, such that the dual-mode sliding clip (101) is axially captured by the turbine-side abutment surface (168) of the bearing housing closure, and the compressor-side surface (67) of the bearing housing. The bearing housing closure (6), in the exemplary embodiment of the invention, is bolted to the bearing housing; but it can be mounted to the bearing housing by any of the common methods used to typically hold this assembly together, including vee-bands, bolts and nuts, or studs and nuts.

Thus in the exemplary first embodiment of the invention, the REB cartridge is captured by the assembly of the bearing housing, the bearing housing closure, and dual-mode sliding clip (101). In this manner, the turbocharger (axial) aerodynamic thrust loads are transmitted through the dual-mode sliding clip to axial loads are transmitted to the bearing housing in both axial directions, or the bearing housing in one axial direction and the bearing housing closure plate in the other axial direction, thus axially constraining the REB cartridge and thus controlling the axial position of the rotating assembly. Since the dual-mode sliding clip (101) has an anti-rotation feature (104) which is constrained rotationally by the pin (93) in the bearing housing, it can be seen that both axial and rotational constraint functions are delivered by a single, cost effective part: the dual-mode sliding clip.

In the above discussed exemplary first embodiment of the invention, the shape of the projecting material was a radially slightly smaller reverse image of the shape of the removed material on the compressor-side of the snap ring in the bearing housing in order for the abutment or projecting material to axially constrain the sliding clip in the direction of the compressor. The shape of the projecting material could be a circle segment, or it can be of such a shape that it does not cover the entire sliding clip on the compressor-side of the sliding clip. The shape of the projecting material must be sufficient to constrain the sliding clip in the direction of the compressor.

In a first variation of the first embodiment of the invention, as depicted in FIG. 11B, the depth of the recess (96) (formed by the depth of the recess surface (67) from the bearing housing surface (8)) in the compressor-side of the bearing housing, is equal to the sum of the thickness of the sliding clip, (from the surface (109) to the surface (108)) plus the projection of the abutment (98), (from the surface (7) of the bearing housing closure to the surface (168) of the abutment projection) in the bearing housing closure. For the purpose of clarity the cavity for the sliding clip thickness, as defined above, shall be known as "the depth of the sliding clip axial cavity".

In the design of the REB retention system thermal expansion and contraction of the various parts must be taken into consideration. In the worst thermal/tolerance stack condition the sliding clip thickness may be at most equal to the depth of the sliding clip axial cavity and in the worst thermal/tolerance stack condition case, the sliding clip may not be loose in the sliding clip axial cavity.

This dual-mode sliding clip and the REB cartridge, constraining system fulfills the needs for constraint of the REB cartridge, in both axial and rotational directions, and the need for the assembly task to be easily mastered by the assembly personnel, as well as the need to easily visually verify that the constraining device was actually and correctly installed in the completed turbocharger assembly. The dual-mode sliding clip provides a simple, assembly-foolproof, low cost, easy to machine anti-rotation feature to allow a damping oil film flow around the REB cartridge, yet prevent the bearing cartridge of a rolling element bearing assembly from rotating relative to the bearing housing.

In a second variation of the first embodiment of the invention, as depicted in FIG. 11A, the compressor-side face (8) of the bearing housing (3) is flat (with no recess (96)) in the region of the sliding clip, and the recess (97) is in the turbine-side face (7) of the bearing housing closure (6). The axially aligned pin (93) may be in the bearing housing (3), or it may be in the bearing housing closure (6). The function is similar in either case for the pin.

In a third variation of the first embodiment of the invention, a dual-mode sliding clip (110), as seen in FIG. 12B in plan view, looks substantially the same as that of the exemplary first embodiment of the invention, as seen in FIG. 5A. Instead of providing a pin fixed axially in the bearing housing (3) a protruding feature (117) is provided on, or in, the sliding clip (110). This protruding feature fits into a reverse-imaged, slightly larger feature (116) in the bearing housing face (8) to provide a rotationally arresting mechanism for the unique alignment and rotational constraint of the sliding clip and the bearing housing.

While in the exemplary third variation of the first embodiment of the invention, the protruding feature in the sliding clip protrudes in the direction of the turbine side of the bearing housing and fits into a recess in the bearing housing, the protrusion could protrude in the direction of the compressor side of the turbocharger in which case the recess for anti rotation and unique orientation would be in the bearing housing closure (6).

In the first embodiment of the invention, as depicted in FIGS. 5A, 6, 7A, 7B, 9A, 9B, 11A, and 11B, the anti-rotation device is a geometric feature in which a pin (93) fits into a scallop (104) in the bearing housing (3). In a second embodiment of the invention, as depicted in FIGS. 10A and 10B, the anti-rotation feature (114) of the dual-mode sliding clip (105) encompasses more of the outside surface (111) of the sliding clip than the scallop (104), and the anti-rotation feature in the first embodiment of the invention.

In the second embodiment of the invention, the rotation arresting feature (114) of the sliding clip (105) fits into a reverse imaged scallop (113) in the bearing housing such that the angular orientation of the snap ring in the scallop in the bearing housing is unique. The fitting of the flat surfaces (107) on the inside surface of the dual-mode sliding clip (101) to the corresponding flat surfaces (106) in the REB cartridge or, outer race (64), remain the same as those of the first embodiment of the invention.

So it can be seen that in either embodiment of the invention, a singular, cost-effective, dual-mode snap ring constrains both the axial position and the rotation of the REB cartridge with respect to the bearing housing.

Now that the invention has been described, what is claimed is:

The invention claimed is:
1. A turbocharger including:
   a shaft having a compressor end and a turbine end;
   a bearing housing (3) including a bearing bore and having a compressor side and a turbine side;
   a rolling element bearing (REB) cartridge supported in said bearing bore, the REB cartridge comprising at least one inner race (65, 65C, 65T), at least one outer race (64), and a series of rolling elements, each rolling element in contact with an inner race and an outer race, wherein the REB cartridge has a center axis, a compressor end, and a turbine end, and wherein a circumferential groove (94) is formed in the outer circumference of the REB cartridge (64), perpendicular to the center axis, and near the compressor end or turbine end of the REB cartridge;

a bearing housing closure plate (6) mounted to the compressor side of the bearing housing; and a sliding clip, wherein the REB cartridge is located in the bearing housing bore, wherein the shaft is rotationally supported by the REB cartridge, wherein the sliding clip is seated partially in the groove (94) in the REB cartridge and is axially constrained between the bearing housing (3) and the bearing housing closure plate (6), thereby axially locating the REB cartridge, and wherein the sliding clip has at least one anti-rotation feature in engagement with a cooperating anti-rotation feature in the groove (94) and at least one anti-rotation feature in engagement with a cooperating anti-rotation feature in at least one of the bearing housing (3) and the bearing housing closure plate (6), such that the sliding clip prevents rotation of the outer race.

2. The turbocharger of claim 1, wherein the radially inner surface of the sliding clip is generally circular, and wherein the anti-rotation feature is a straight or curved deviation from said generally circular radially inner surface.

3. The turbocharger of claim 1, wherein the outer diameter of the outer race corresponds to the outer diameter of the REB cartridge.

4. The turbocharger of claim 1, wherein the REB cartridge comprises a sleeve containing at least two REB assemblies, each REB assembly comprising at least one inner race (65, 65C, 65T), at least one outer race (64), and a series of rolling elements, each rolling element in contact with an inner race and an outer race, said sleeve defining the outer diameter of the REB cartridge.

5. The turbocharger of claim 1, wherein the radially outer surface of the sliding clip is generally circular, and wherein the anti-rotation feature is a straight, convex or concave deviation from said generally circular radially outer surface.

6. The turbocharger of claim 5, wherein the anti-rotation feature comprises at least one concave projection from the generally circular radially outer surface.

7. The turbocharger of claim 5, wherein the anti-rotation feature comprises at least one convex recess from the generally circular radially outer surface.

8. The turbocharger of claim 1, wherein the circumferential groove (94) formed in the outer circumference of the REB cartridge is near the compressor end of the REB cartridge.

9. The turbocharger of claim 1, wherein the sliding clip is generally planar, and wherein at least one of the anti-rotation features is an axial projection from the generally planar surface of the snap ring.

10. The turbocharger of claim 1, wherein the bore is free of any turbine-end axial abutment (73).

11. A turbocharger including:

a shaft having a compressor end and a turbine end;

a bearing housing (3) including a bearing bore;

a rolling element bearing (REB) cartridge supported in said bearing bore, the REB cartridge comprising at least one inner race (65, 65C, 65T), at least one outer race (64), and a series of rolling elements, each rolling element in contact with an inner race and an outer race, wherein the REB has a center axis, a compressor end, and a turbine end, and wherein a circumferential groove (94) is formed in the outer circumference of the REB cartridge (64), perpendicular to the center axis, and near the compressor end or turbine end of the REB cartridge; and a sliding clip, wherein the REB cartridge is located in the bearing housing bore, wherein the shaft is rotationally supported by the REB cartridge, wherein the sliding clip is seated partially in the REB cartridge groove (94) and is axially constrained by the bearing housing (3), thereby axially locating the REB cartridge, and wherein the sliding clip has at least one anti-rotation feature in engagement with a cooperating anti-rotation feature in the REB cartridge groove (94) and at least one anti-rotation feature in engagement with a cooperating anti-rotation feature in the bearing housing (3), such that the sliding clip prevents rotation of the outer race.

* * * * *